United States Patent
Matsumoto et al.

(10) Patent No.: US 8,014,807 B2
(45) Date of Patent: Sep. 6, 2011

(54) TRANSMISSION POWER CONTROL APPARATUS, PROPAGATION PATH ESTIMATING APPARATUS, TRANSMISSION POWER CONTROL METHOD, AND PROPAGATION PATH ESTIMATING METHOD

(75) Inventors: Atsushi Matsumoto, Ishikawa (JP); Sadaki Futagi, Ishikawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 955 days.

(21) Appl. No.: 11/722,859

(22) PCT Filed: Dec. 26, 2005

(86) PCT No.: PCT/JP2005/023807
§ 371 (c)(1),
(2), (4) Date: Jun. 26, 2007

(87) PCT Pub. No.: WO2006/070755
PCT Pub. Date: Jul. 6, 2006

(65) Prior Publication Data
US 2009/0005101 A1    Jan. 1, 2009

(30) Foreign Application Priority Data
Dec. 28, 2004 (JP) .................................. 2004-380979

(51) Int. Cl.
*H04B 7/00* (2006.01)
(52) U.S. Cl. ...... 455/522; 455/69; 455/13.4; 455/127.3; 455/127.5; 370/278; 370/319; 375/295; 375/316; 713/320
(58) Field of Classification Search .............. 370/344, 370/278, 282, 318, 319, 335, 342, 340; 455/522, 455/69, 13.4, 127.1, 127.5, 127.3, 115.3, 455/232.1; 713/320; 375/295, 316, 296; 330/2
See application file for complete search history.

(56) References Cited

U.S. PATENT DOCUMENTS
5,883,888 A * 3/1999 St-Pierre ...................... 370/331
6,466,563 B1 10/2002 Yamada
(Continued)

FOREIGN PATENT DOCUMENTS
JP        1141203      2/1999
JP       200360609     2/2003
JP      2003-348047   12/2003

OTHER PUBLICATIONS
PCT International Search Report dated Feb. 28, 2006 with English translation.

(Continued)

*Primary Examiner* — Temesghen Ghebetinsae
*Assistant Examiner* — Shaima Q Aminzay
(74) *Attorney, Agent, or Firm* — Dickinson Wright PLLC (57) ABSTRACT

A transmission power control apparatus capable of reducing unnecessary transmission power that is consumed in transmission of pilot symbols. In the apparatus, a power control part establishes, based on a repetition number of a data signal, a transmission power value of a pilot signal. For example, the power control part establishes, based on an improved reception quality when data signals as replicated in accordance with the repetition number of a data signal are combined, a transmission power value of a pilot signal at a level required and sufficient for meeting a target value of the reception quality of the other end of communication. A power amplifying part amplifies the pilot signal in accordance with the established transmission power value.

4 Claims, 9 Drawing Sheets

U.S. PATENT DOCUMENTS

| | | | |
|---|---|---|---|
| 6,792,251 B2 * | 9/2004 | Johannisson et al. | 455/126 |
| 2002/0085641 A1 * | 7/2002 | Baum | 375/260 |
| 2002/0159422 A1 * | 10/2002 | Li et al. | 370/342 |
| 2002/0191535 A1 * | 12/2002 | Sugiyama et al. | 370/208 |
| 2003/0007472 A1 * | 1/2003 | Yamada | 370/335 |
| 2004/0081076 A1 * | 4/2004 | Goldstein et al. | 370/208 |
| 2004/0120411 A1 * | 6/2004 | Walton et al. | 375/260 |
| 2006/0083189 A1 * | 4/2006 | Laroia et al. | 370/319 |

OTHER PUBLICATIONS

N. Maeda, et al.: "Kudari Link Broadband Channel ni Okeru OFCDM to OFDM no Tokusei Hikaku," IEICE Technical Report RCS2002-162, Aug. 23, 2002, pp. 95-100.

Ngajikin N., et al.: Papr reduction in WLAN-OFDM system using code repetition technique, Research and Development, 2003. Scored 2003. Proceedings. Student Conference on Aug. 26, 2003, pp. 85-89.

* cited by examiner

| THE NUMBER OF REPETITIONS | OFFST VALUE[dB] |
|---|---|
| 1 | 0 (REFERENCE) |
| 2 | -1 |
| ⋮ | ⋮ |
| 8 | -6 |
| 16 | -10 |

TRANSMISSION POWER CONTROL APPARATUS, PROPAGATION PATH ESTIMATING APPARATUS, TRANSMISSION POWER CONTROL METHOD, AND PROPAGATION PATH ESTIMATING METHOD

TECHNICAL FIELD

The present invention relates to a transmission power control apparatus and transmission power control method that perform transmission power control of pilot symbols used in transmission channel estimation in radio communication systems. The present invention also relates to a transmission channel estimation apparatus and transmission channel estimation method that perform transmission channel estimation using these pilot symbols.

BACKGROUND ART

In recent years, in radio communications, especially in mobile communications, in addition to voice, various information including image is transmitted. Along with this diversification of media of transmission, technologies for enabling high-speed transmission of information are in demand. The OFDM (Orthogonal Frequency Division Multiplexing) scheme is a multicarrier transmission scheme having features of high spectrum efficiency and low inter-symbol interference in the multipath environment, and is currently a focus of attention as a transmission scheme that may meet the above-noted demand.

In a radio communication system adopting the OFDM scheme, for example, at the transmitting side, a plurality of the same data symbols are generated by duplicating a data symbol (hereinafter this process will be referred to as "repetition") in the frequency domain (that is, on a plurality of subcarriers), and, at the receiving side, these symbols are combined (using, for example, maximum ratio combining). In the following description, OFDM schemes involving the above processing will be referred to as "repetition OFDM". In this case, the received quality of data symbols (for example, SNR: Signal to Noise Ratio, and SIR: Signal to Interference Ratio) is improved by combining. A subcarrier may be referred to as a "tone".

Also, to implement high-speed transmission, it is important to maintain the reception performance at the receiving side at a certain level or higher, and, for this purpose, adequate control for accurate transmission channel estimation is necessary. For example, patent document 1 proposes a method for controlling transmission power for pilot symbols used in transmission channel estimation and controlling the accuracy transmission channel estimation. Specifically, patent document 1 proposes controlling transmission power for pilot symbols according to the modulation scheme and coding rate of data symbols. For example, a modulation scheme that is less robust to frequency selective fading requires high accuracy in transmission channel estimation, and, consequently, the transmission power of pilot symbols is increased. On the other hand, a modulation scheme that is more robust to frequency selective fading does not require so much accuracy in transmission channel estimation, and, consequently, the transmission power of pilot symbols is decreased.

Patent Document 1: Japanese Patent Application Laid-Open No. 2003-60609

DISCLOSURE OF THE INVENTION

Problems to be Solved by the Invention

However, if the above conventional transmission power control method is simply applied to the above-mentioned repetition OFDM, the following problem arise. In repetition OFDM, as noted above, a plurality of the same data symbols are combined and thereby the received quality of data symbols improves. In other words, in this case, transmission power for pilot symbols required to ensure a certain level of reception performance or higher decreases. On the other hand, with conventional transmission power control methods, the transmission power of pilot symbols is controlled, regardless of the improvement of received quality of data symbols after combining. Transmission power of pilot symbols may thus be excess, and unnecessary transmission power is consumed in transmission of pilot symbols.

It is therefore an object of the present invention to provide a transmission power control apparatus, transmission channel estimation apparatus, transmission power control method and transmission channel estimation method that are able to reduce unnecessary transmission power consumed in transmission of pilot symbols.

Means for Solving the Problem

A transmission power control apparatus of the present invention adopts a configuration having: a setting section that sets a transmission power value for a pilot signal based on the number of repetitions of a data signal; and an amplifying section that amplifies the pilot signal according to the transmission power value.

A transmission channel estimation apparatus of the present invention adopts a configuration having: an attenuation section that attenuates a pilot signal amplified according to a transmission power value, said transmission power value being set based on the number of repetitions of a data signal; and an execution section that executes transmission channel estimation using the attenuated pilot signal.

A transmission power control method of the present invention has the steps of: setting a transmission power value for a pilot signal based on the number of repetitions of a data signal; and amplifying the pilot signal according to the transmission power value.

A transmission channel estimation method of the present invention has the steps of: attenuating an amplified pilot signal according to a transmission power value set based on the number of repetitions of a data signal; and executing transmission channel estimation using the attenuated pilot signal.

Advantageous Effect of the Invention

According to the present invention, it is possible to reduce unnecessary transmission power consumed in transmission of pilot symbols.

BEST MODE FOR CARRYING OUT THE INVENTION

Embodiments of the present invention will be described in detail below using the accompany drawings.

Embodiment 1

Figure 1:
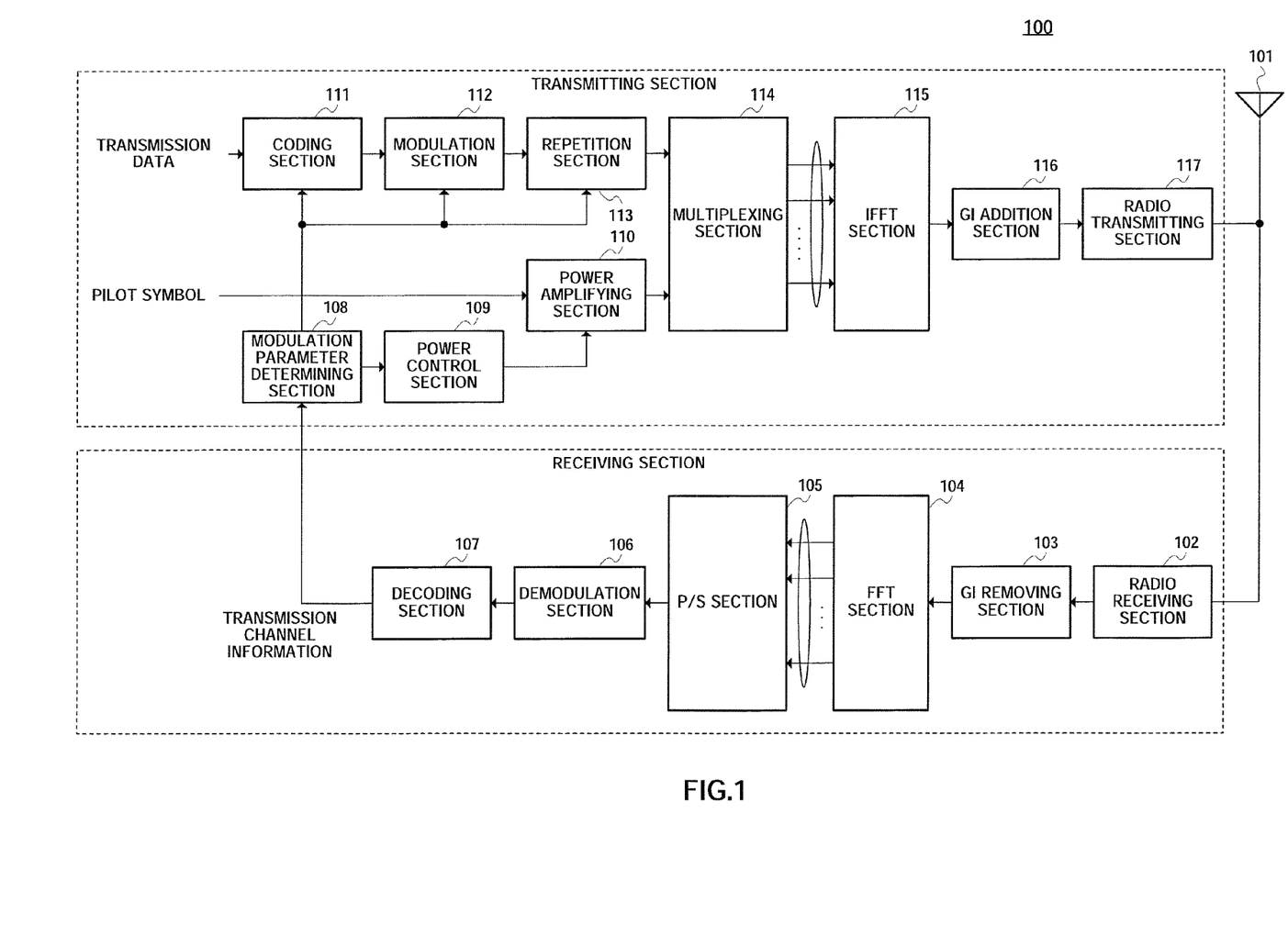
FIG. 1 is a block diagram showing a configuration of a base station apparatus, according to Embodiment 1 of the present invention.

FIG. 1 is a block diagram showing a configuration of a base station apparatus provided with a radio transmitting apparatus according to Embodiment 1 of the present invention. Base station apparatus 100 of FIG. 1 has: antenna 101; radio receiving section 102; GI (Guard Interval) removing section 103; FFT (Fast Fourier Transform) section 104; (Parallel-to-Serial) conversion section 105; demodulation section 106; decoding section 107; modulation parameter determining section 108; power control section 109; power amplifying section 110; coding section 111; modulation section 112; repetition section 113; multiplexing section 114; IFFT (Inverse Fast Fourier Transform) section 115; GI addition section 116; and radio transmitting section 117. Also, radio receiving section 102, GI removing section 103, FFT section 104, P/S section 105, demodulation section 106 and decoding section 107 constitute a receiving section. Modulation parameter determining section 108, power control section 109, power amplifying section 110, coding section 111, modulation section 112, repetition section 113, multiplexing section 114, IFFT section 115, GI addition section 116 and radio transmitting section 117 constitute a transmitting section of a radio transmitting apparatus.

Radio receiving section 102 receives a radio signal transmitted from a communicating party, via antenna 101, and performs predetermined radio processing (for example, down-converting and A/D conversion) on the radio signal. The received signal after radio processing is outputted to GI removing section 103. GI removing section 103 removes the GI added in a predetermined position in the received signal. The received signal after GI removal is outputted to FFT section 104. FFT section 104 performs FFT processing on the received signal after GI removal. P/S section 105 performs parallel-to-serial conversion on the received signal after FFT processing. Demodulation section 106 demodulates the received signal after parallel-to-serial conversion. Decoding section 107 decodes the received signal after demodulation.

Modulation parameter determining section 108 obtains transmission channel information included in the received signal decoded by decoding section 107, extracts information indicating the received SNR of the pilot symbols from the transmission channel information and reports this information to power control section 109. The received SNR is a measured value obtained by performing received quality measurement at the communicating party. In addition, the transmission channel information is generated at the communicating party, multiplexed in a radio frame, and fed back from the communicating party. Further, the information showing the received SNR of the pilot symbols is generated at the communication party.

Also, modulation parameter determining 108 decides modulation parameters based on the obtained transmission channel information. With this embodiment, modulation parameters includes the coding rate used in coding at coding section 111, the modulation scheme used in modulation at modulation section 112 and the number of repetitions used in repetition at repetition section 113. The decided coding rate, modulation scheme and number of repetitions are reported to coding section 111, modulation section 112, and repetition section 113 and power control section 109, respectively.

Coding section 111 encodes transmission data using the coding rate reported from modulation parameter determining section 108. Modulation section 112 modulates the encoded transmission data using the modulation scheme reported from modulation parameter determining section 108. By means of this modulation, data symbols are obtained. Modulation schemes for use include, for example, BPSK (Binary Phase Shift Keying), QPSK (Quadrature Phase Shift Keying) and 16 QAM (Quadrature Amplitude Modulation).

Repetition section 113 performs repetition processing of the data symbols according to the number of repetitions reported from modulation parameter determining section 108. One or more data symbols (for example, R data symbols) obtained by repetition processing of one data symbol, are outputted to multiplexing section 114.

Here, the number of repetitions means the number of data symbols after repetition of one data symbol. Specifically, when the number of repetitions is "1", the number of data symbols after repetition is "1". In this case, when a data symbol is received as input from modulation section 112, repetition section 113 outputs the data symbol as is. When the number of repetitions is two or more, a data symbol is outputted in repetition. For example, when the number of repetitions is "2", the number of data symbols after repetition is "2". In this case, when a data symbol is received as input from modulation section 112, repetition section 113 outputs the data symbol twice in repetition. Further, when the number of repetitions is "16", the number of data symbols after repetition is "16". In this case, when a data symbol is received as input from modulation section 112, repetition section 113 outputs the data symbol sixteen times in repetition.

Power control section 109 as a setting means sets the transmission power value for the pilot symbols to a level adequate to satisfy a target reception quality value of the communicating party in accordance with the received SNR and the number of repetitions reported from modulation parameter determining section 108. With this embodiment, power control section 109 sets the transmission power value for the pilot symbols by calculating an amplification value for use in amplification at power amplifying section 110. The calculated amplification value is reported to power amplifying section 110. The operations of power control section 109 will be described in detail later. Although it has been described that the amplification value is calculated at power control section 109, a configuration may be adopted where the amplification value is calculated at the communicating party and fed back to power control section 109.

Power amplifying section 110 amplifies pilot symbols generated at a pilot symbol generation section (not shown) according to the amplification value reported from power control section 109. The amplified pilot symbols have the transmission power value set at power control section 109. The amplified pilot symbols are outputted to multiplexing section 114.

In other words, the transmission power control apparatus according to this embodiment is configured by combining power control section 109 and power amplifying section 110.

Multiplexing section 114 multiplexes the R data symbols inputted from repetition section 113 and the pilot symbol amplified by power amplifying section 110 in a radio frame. The radio frame after multiplexing is outputted to IFFT section 115.

IFFT section 115 performs IFFT processing on the radio frame inputted from multiplexing section 114. GI addition section 116 adds a GI in a predetermined position in the radio frame after IFFT processing. Radio transmitting section 117 performs predetermined radio processing (for example, D/A conversion and up-converting) on the radio frame after GI addition, and transmits the radio signal after radio processing via antenna 101.

Figure 2:
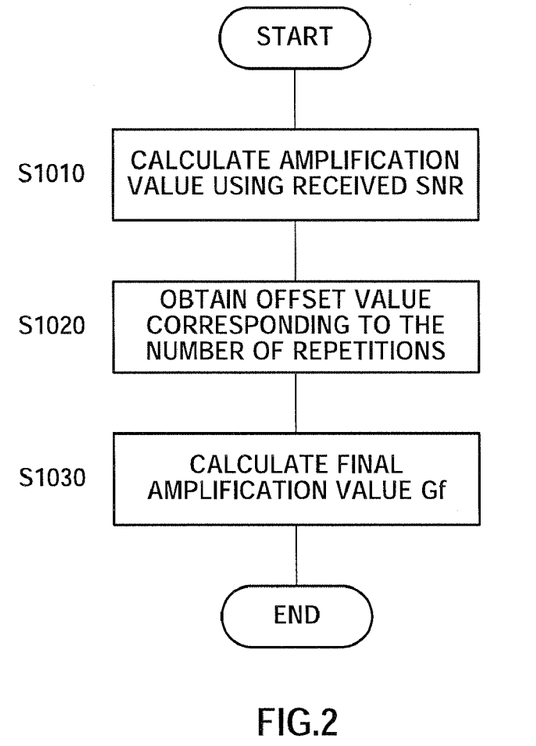
FIG. 2 is a flowchart showing the operations of a power control section, according to Embodiment 1 of the present invention.

Next, the operations at power control section 109 will be described using FIG. 2.

First, in step S1010, the amplification value (initial value) G is calculated using the received SNR reported from modulation parameter determining section 108. Specifically, the amplification value G is calculated by subtracting the reported received SNR from the required SNR (i.e., the target value of the received SNR).

Figure 3:
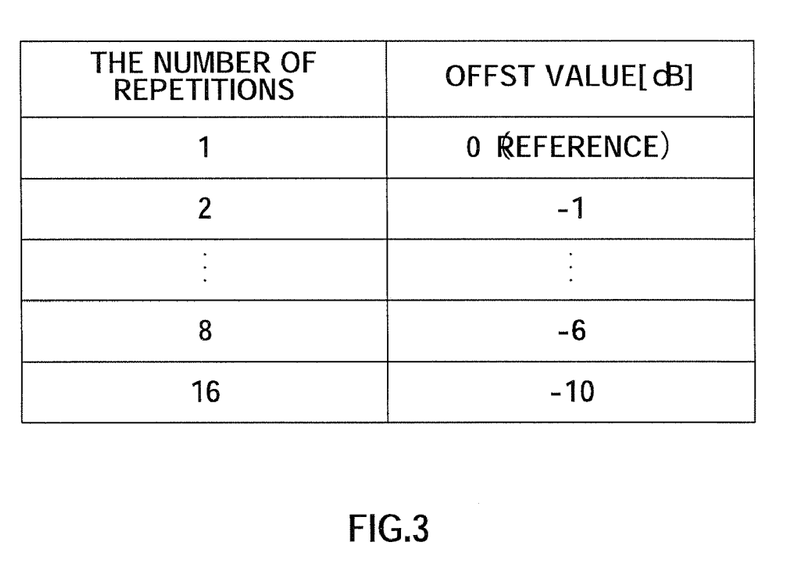
FIG. 3 shows a reference table for power control use, according to Embodiment 1 of the present invention.

Also, in step S1020, the offset value a corresponding to the number of repetitions reported from modulation parameter determining section 108, is obtained. With this embodiment, power control section 109 stores a reference table for power control use, in advance. FIG. 3 shows an example of this reference table for power control use. When this reference table for power control use is used and, for example, the number of repetitions "2" is inputted, the offset value "−1" is obtained. Also, for example, if the number of repetitions "16" is inputted, the offset value "−10" is obtained. Accordingly, the absolute value of the offset value, that is, the difference between the amplification value G and the final amplification value Gf (described later) is increased following the increase of the number of repetitions and decreased following the decrease of the number of repetitions. By this means, the setting of the transmission power value for the pilot symbols is implemented. To be more specific, the transmission power value for the pilot symbols is decreased as the number of repetitions increases and is increased as the number of repetitions decreases.

The method of obtaining the offset value a is not limited to the above example, and a function may be used that derives the corresponding number of repetitions from the inputted number of repetitions. Alternatively, the above method of using a table and the above-mentioned method of using a function may be used together. When a function is used that derives the corresponding number of repetitions from the inputted number of repetitions, it is possible to define more flexible relationships.

Also, the reference table for power control use can be updated in accordance with transmission quality required by the system. For example, when the required transmission quality changes from 1% to 0.5%, the reference table for power control use may be updated. Upon update of the table, the updated information may be reported to the communicating party.

Also, the processing order of step S1010 and step S1020 is not particularly limited. The processing of step S1010 may be executed first or the processing of step S1020 may be executed first.

Then, in step S1030, the amplification value G is corrected by adding the offset value α to the amplification value G. By this correction processing, final amplification value Gf is calculated. The calculated final amplification value Gf is outputted to power amplifying section 110 as the value to be used in the amplification of the pilot symbols.

A method has been described as an example with this embodiment where two-step processing of determining the amplification value G (initial value) using the received SNR and then determining the final amplification value Gf—that is, a method of obtaining the final amplification value Gf indirectly from the received SNR—is adopted. However, it is equally possible to use a table or a function where by the final amplification value Gf is obtained directly from the received SNR.

Figure 4:
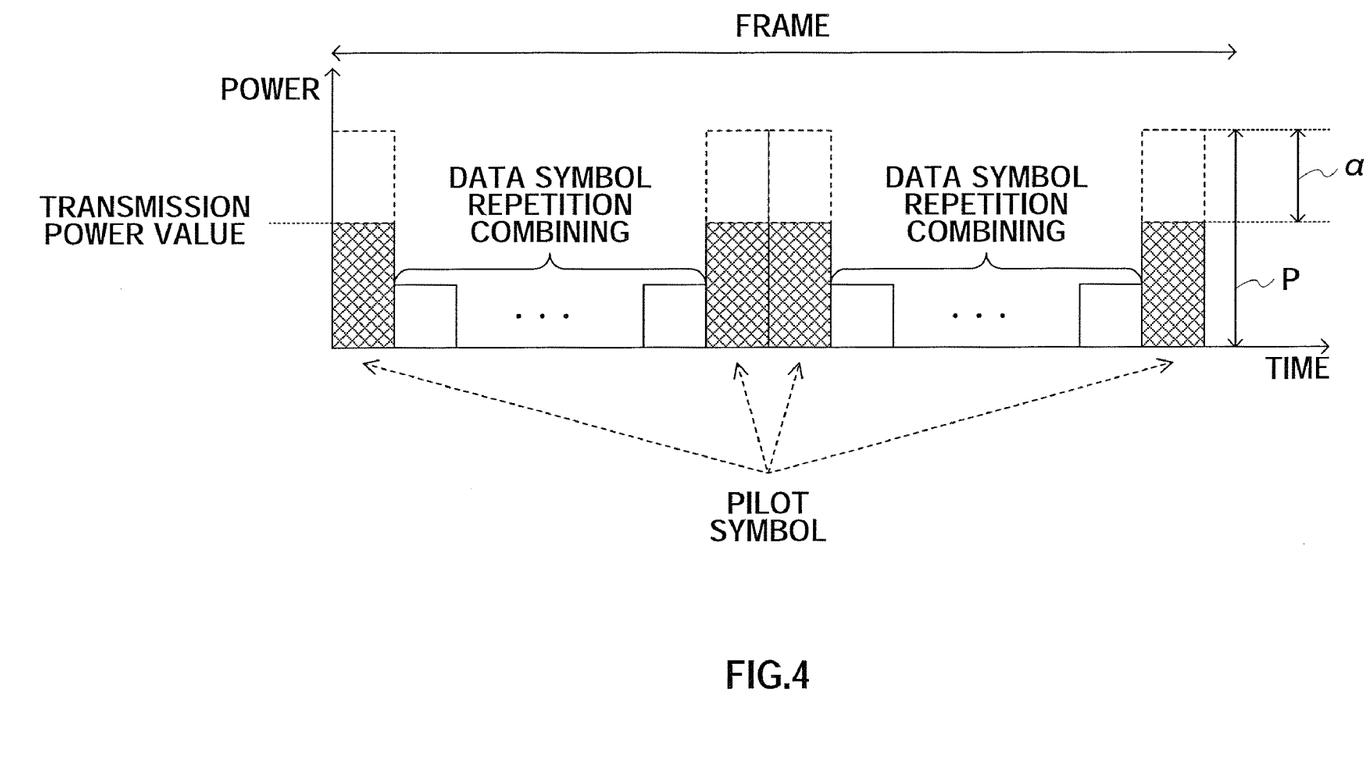
FIG. 4 explains transmission power values for pilot symbols mapped on a radio frame, according to Embodiment 1 of the present invention.

Next, pilot symbols multiplexed in a radio frame will be described. As shown in FIG. 4, pilot symbols are mapped in predetermined positions in a radio frame. In this figure, P represents the transmission power value of pilot symbols when the amplification value G is not corrected or before the amplification value G is corrected. If the offset value α is added to this transmission power value P, the transmission power value of the setting for the pilot symbols is obtained. The format of the radio frame generated by multiplexing pilot symbols and data symbols, is not limited to the format shown in FIG. 4.

According to this embodiment, when the transmission power value of pilot symbols is set in accordance with the number of repetitions (that is, when the degree of received quality improvement for data symbols by means of combining on the receiving side increases following the increase of the number of repetitions), the transmission power value of pilot symbols is decreased, and, on the other hand, when the degree of received quality improvement for data symbols on the receiving side by means of combining decreases following the decrease of the number of repetitions, the transmission power value of pilot symbols is increased, so that it is possible to prevent pilot symbols from using excessive transmission power and reduce unnecessary transmission power consumption in pilot symbol transmission.

Prevention of excessive transmission power for a pilot symbols will be described in detail below.

Figure 5:
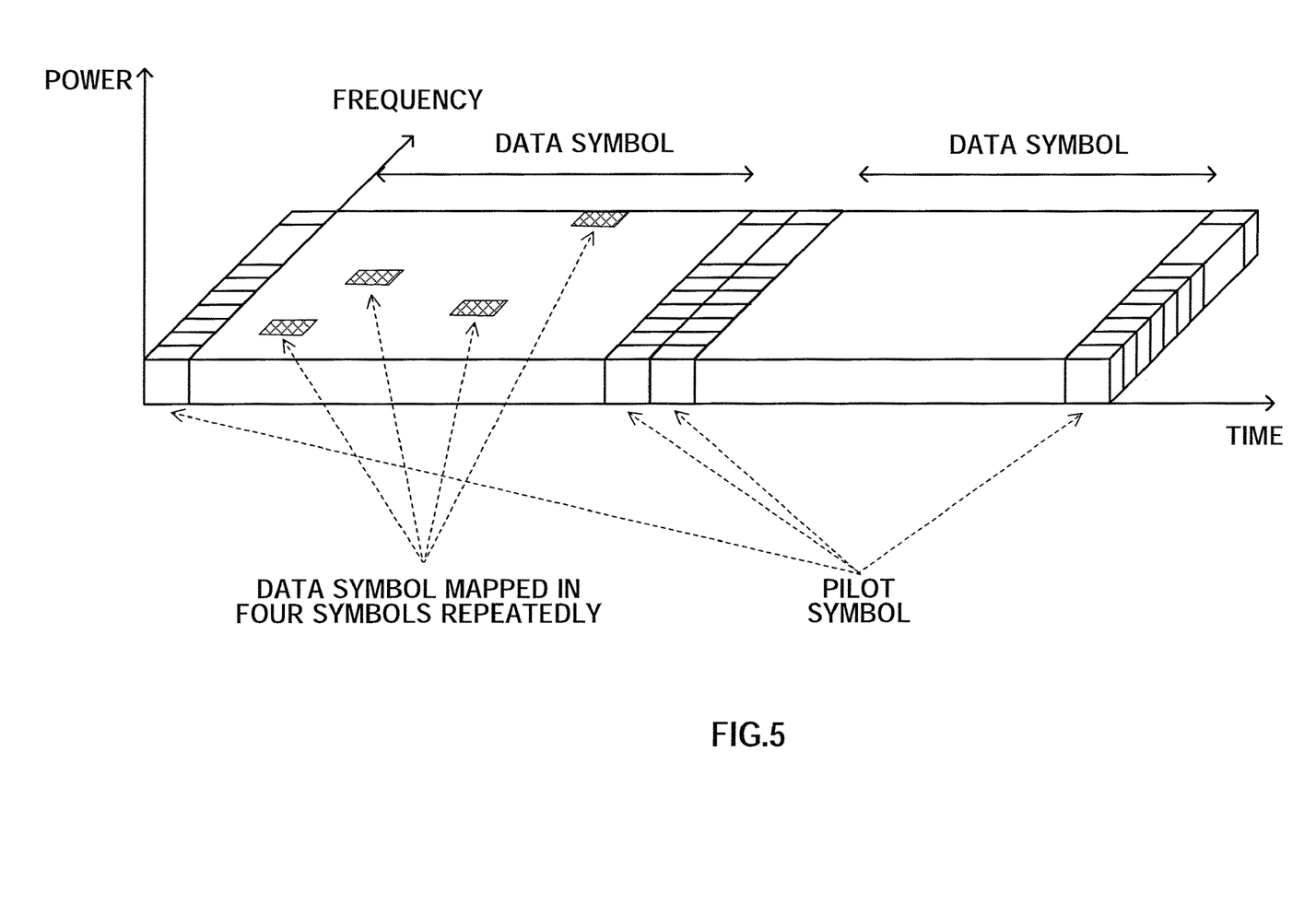
FIG. 5 shows an example of pilot symbols arrangement, according to Embodiment 1 of the present invention.

With repetition OFDM, "repetition symbols" (referring to data symbols obtained by duplicating a data symbol) in a radio frame are combined at the receiving side, and, as a result, the SNR after combining improves. On the other hand, as shown in FIG. 5, pilot symbols are transmitted in specific positions in a radio frame and are usually not subject to repetition. In other words, as for the data symbols, it is possible to improve the low-SNR environment by applying repetition. In contrast to this, as for the pilot symbols, it is difficult to improve the low-SNR environment. Assuming that transmission channel estimation is performed using low-SNR pilot symbols at the receiving side, transmission channel estimation values are calculated with numerous errors.

Figure 6:
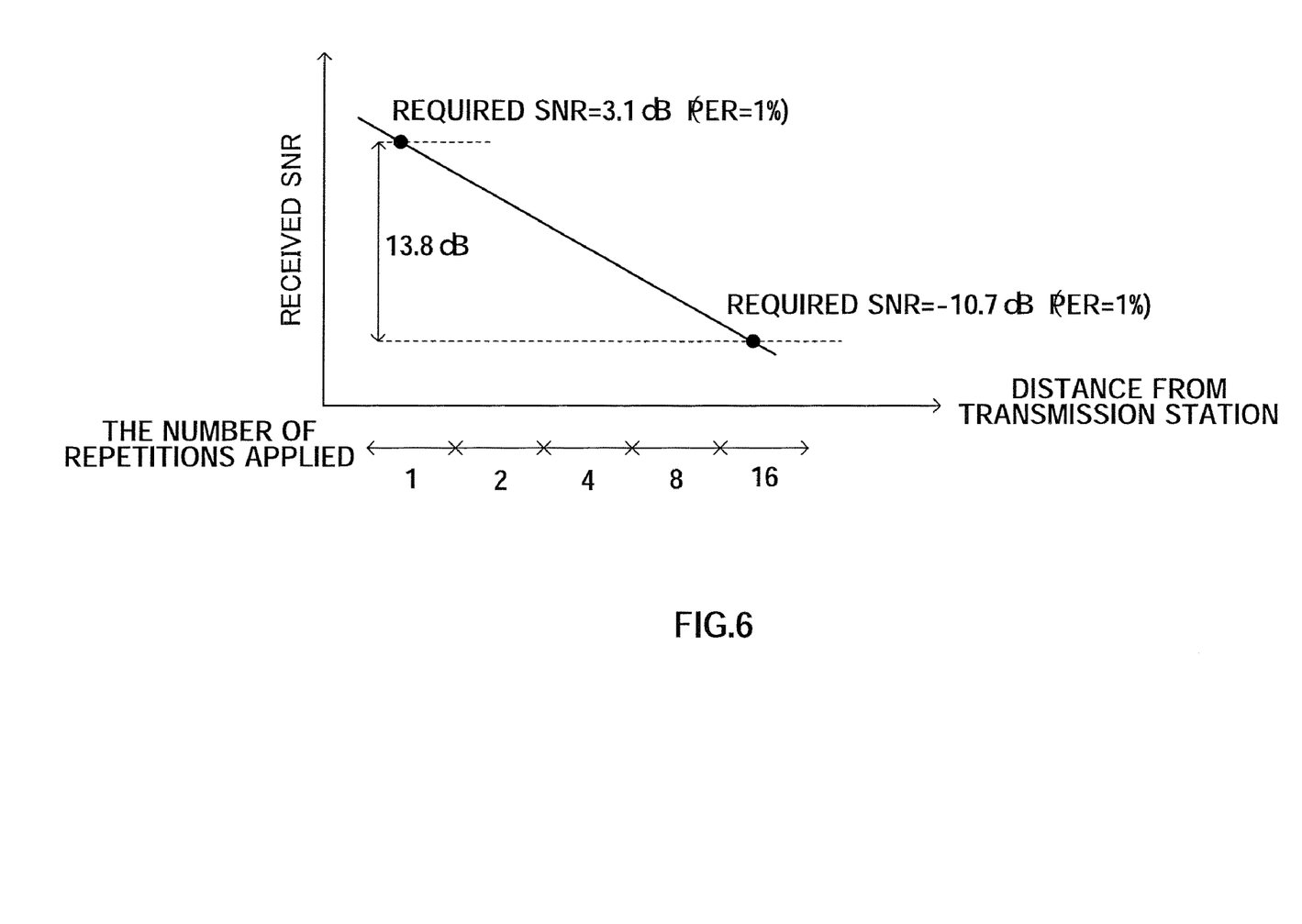
FIG. 6 explains an example of fluctuation of required SNR, according to Embodiment 1 of the present invention.

Accordingly, to prevent reception performance degradation due to transmission channel estimation errors, transmission power for pilot symbols is controlled. FIG. 6 shows the required SNR per symbol satisfying PER=1% when the number of repetitions is "1", and the required SNR per symbol satisfying PER=1% when the number of repetitions is "16". These values are obtained by computer simulation.

It is shown that, when the number of repetitions is "16", the required SNR per symbol is 13.8 dB lower than when the number of repetitions is "1". This is because the SNR after combining is improved by 13.8 dB compared to the SNR without combining (that is, the SNR in the case where the number of repetitions is "1").

On the other hand, when the number of repetitions is "16", the SNR per pilot symbol decreases by 13.8 dB compared to the case where the number of repetitions is "1". Accordingly, transmission power control of pilot symbols is necessary to ensure a certain level of reception performance or higher.

Figure 7:
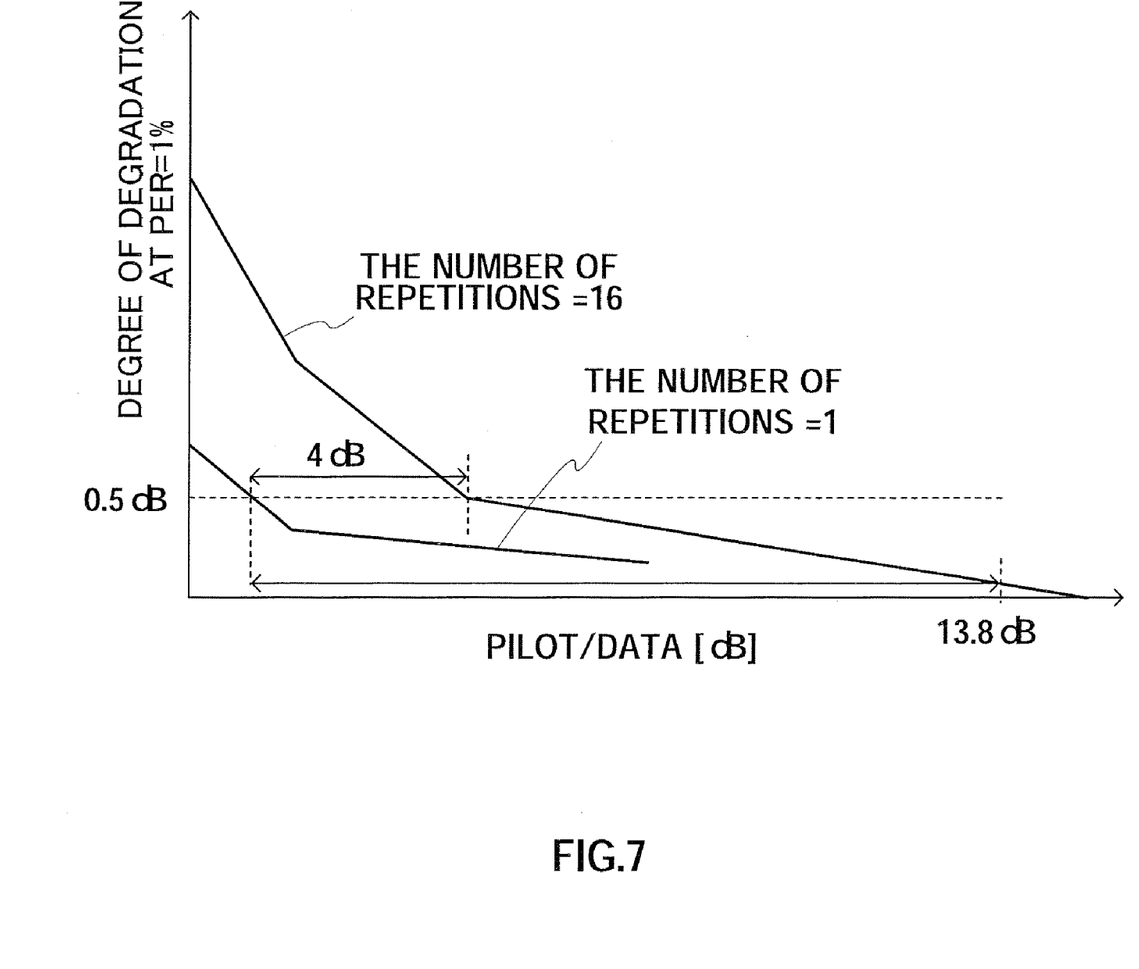
FIG. 7 explains an example of the degree of reception performance degradation in association with the transmission power ratio, according to Embodiment 1 of the present invention.

Here, FIG. 7 will be referred to FIG. 7 shows the degree of degradation at PER=1%, in association with the ratio of the transmission power value for data symbols to the transmission power value for pilot symbols. These values are obtained by computer simulation, and the simulation result for the number of repetitions "16" and the simulation result for the number of repetitions "1" are shown. The degree of degradation is the increment amount of the required SNR—more specifically, it is the increment on top of the PER characteristic of when ideal transmission channel estimation is performed. The value "0.5 dB" shown as the degree of degradation at PER=1% is a tentative target value of reception performance.

According to the simulation result for the number of repetitions "1", the degree of degradation in response to the increase of the transmission power ratio is moderate. In contrast, according to the simulation result for the number of repetitions "16", the degree of degradation in response to the increase of the transmission power ratio in steep. It is then shown that, when the number of repetitions is "16", and the transmission power value is increased by 13.8 dB, the degree of degradation is well below 0.5 dB which is the target value of the degree of degradation. In other words, it is shown that excessive quality of pilot symbols occurs. Referring to the example shown in FIG. 7, when the number of repetitions is "16", about the same level of reception performance is achieved by increasing the transmission power value for pilot symbols 4 dB, as when the number of repetitions is "1".

Figure 8:
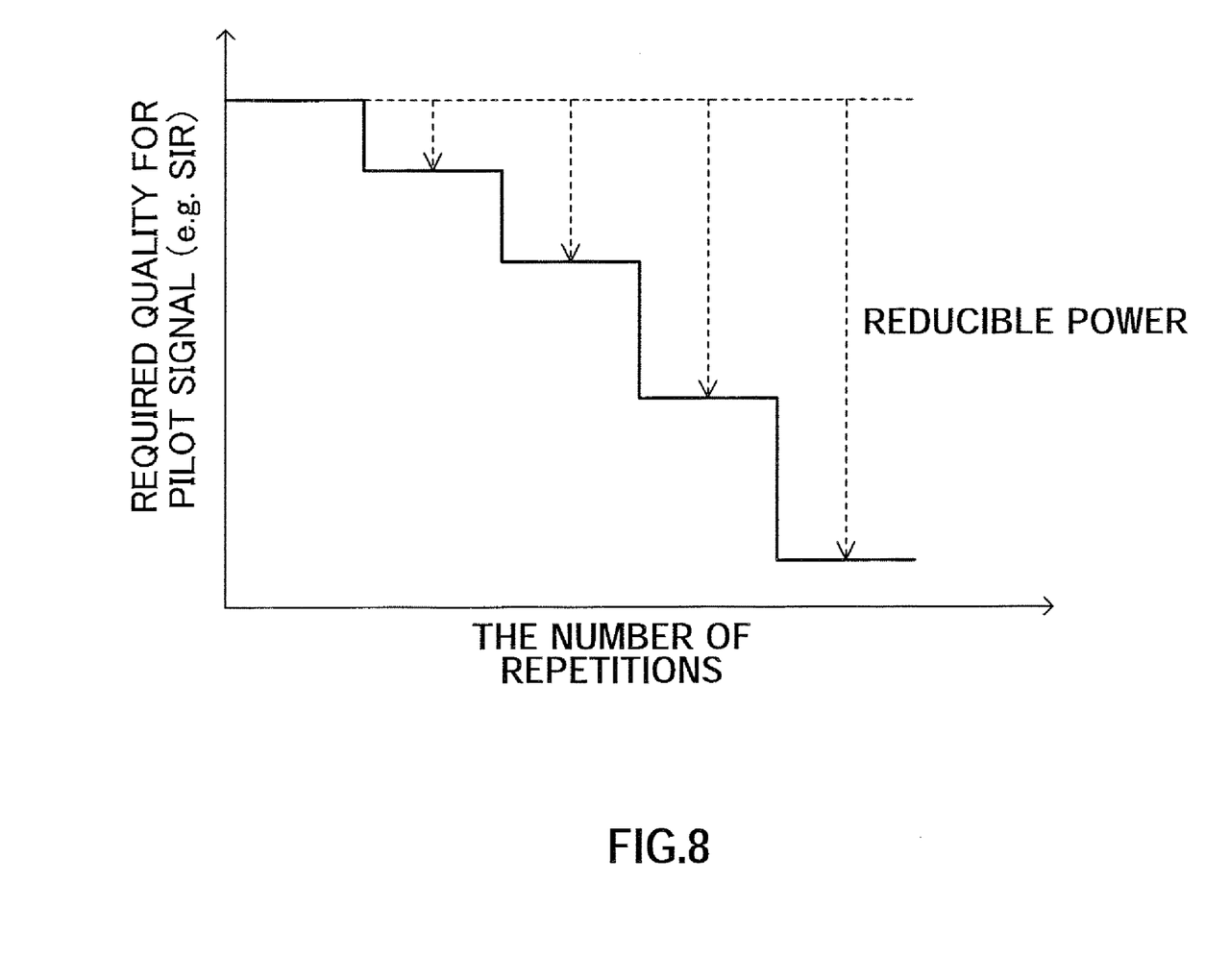
FIG. 8 shows transmission power that is reducible according to the number of repetitions, according to Embodiment 1 of the present invention.

Also, as shown in FIG. 8, the quality of pilot symbols required to ensure a certain level of reception performance decreases as the number of repetitions increases and increases as the number of repetitions decreases. The transmission power that can be reduced with respect to pilot symbols increases as the number of repetitions increases and decreases as the number of repetitions decreases. This is because the degree of reducing the influence of transmission channel estimation error by combining data symbols increases as the number of repetitions increases. Accordingly, according to this embodiment, by performing transmission power control such that the transmission power value for pilot symbols decreases as the number of repetitions increases and increases as the number of repetitions decreases, it is possible to reduce unnecessary transmission power consumption.

Although a case has been described with this embodiment where the transmission power of pilot symbols is controlled in accordance with the number of repetitions of data symbols, a method of controlling the number of pilot symbols in accordance with the number of repetitions of data symbols may be adopted.

Although a case has been described with this embodiment where a radio transmitting apparatus is provided in a base station apparatus, the radio transmitting apparatus may be provided in a communication terminal apparatus. That is to say, the present invention can be applied to not only downlink communications but also uplink communications.

Embodiment 2

Figure 9:
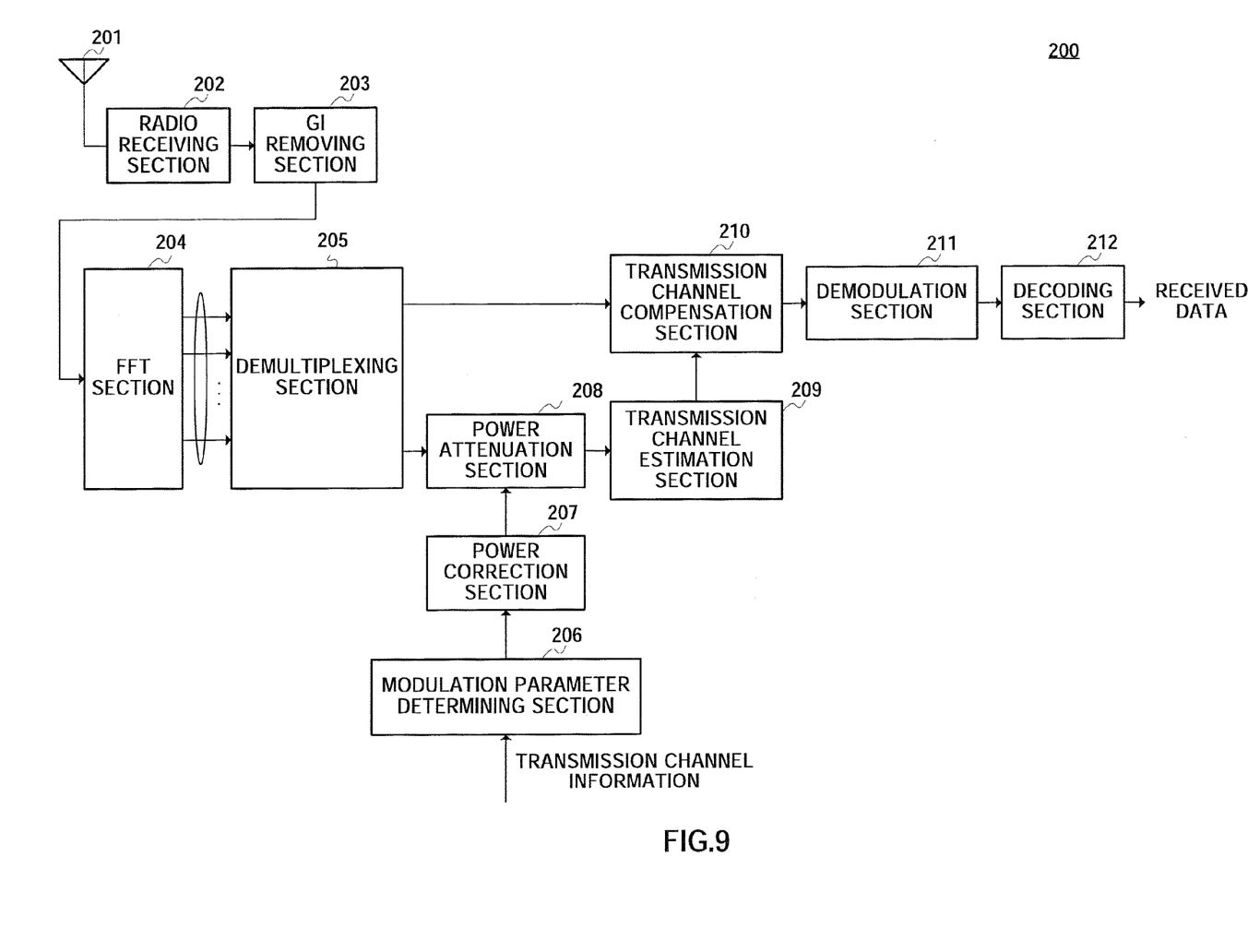
FIG. 9 is a block diagram showing a configuration of a communication terminal apparatus, according to Embodiment 2 of the present invention.

FIG. 9 is a block diagram showing a configuration of a communication terminal apparatus provided with a radio receiving apparatus according to this Embodiment 2. Communication terminal apparatus 200 of FIG. 9 has: antenna 201; radio receiving section 202; GI removing section 203; FFT section 204; demultiplexing section 205; modulation parameter determining section 206; power correction section 207; power attenuation section 208; transmission channel estimation section 209; transmission channel compensation section 210; demodulation section 211; and decoding section 212.

Radio receiving section 202 receives a radio signal transmitted from base station apparatus 100, described in Embodiment 1, via antenna 201. The radio signal is then subjected to predetermined radio processing (including down-conversion and A/D conversion). The received signal (radio frame) after radio processing is outputted to GI removing section 203. GI removing section 203 removes the GI added in a predetermined position in the radio frame. The radio frame after GI removal is outputted to FFT section 204. FFT section 204 performs FFT processing on the radio frame after GI removal. The radio frame after FFT processing is outputted to demultiplexing section 205.

Separation section 205 as an extraction means extracts the data symbols and pilot symbols from the radio frame inputted from FFT section 204, thereby separating the data symbols and the pilot symbols. The extracted data symbols and the extracted pilot symbols are outputted to transmission channel compensation section 210 and power attenuation section 208, respectively.

Modulation parameter determining section 206 receives as input transmission channel information, generated in a transmission channel information generation section (not shown) and including information such as the received SNR measured or calculated in a SNR calculation section (not shown). Modulation parameter determining section 206 extracts information indicating the received SNR from the inputted transmission channel information, and reports this information to power correction section 207.

Also, modulation parameter determining section 206 decides the number of repetitions based on the inputted transmission channel information. In other words, modulation parameter determining section 206 determines the number of repetitions "R" of the data symbols extracted by demultiplexing section 205 based on the inputted transmission channel information. The determined number of repetitions is reported to power correction section 207. The method of deciding the number of repetitions at modulation parameter determining section 206 is the same as the method of deciding the number of repetitions at modulation parameter deciding section 108 described in Embodiment 1.

Power correction section 207 sets the corrected value of the received power value of the pilot symbols extracted by demultiplexing section 205 (that is, the reception power value after correction). With this embodiment, power correction section 207 calculates the amplification value calculated at power control section 109 described in Embodiment 1, thereby setting corrected value of the received power value. The calculated amplification value is reported to power attenuation section 208. The amplification value calculation in power correction section 207 is performed in the same manner as the amplification value calculation method in power control section 109 described in Embodiment 1, based on the received SNR, the required SNR, and the number of repetitions.

The amplification value calculated by power correction section 207 may be fed back to power control section 109.

Figure 10:
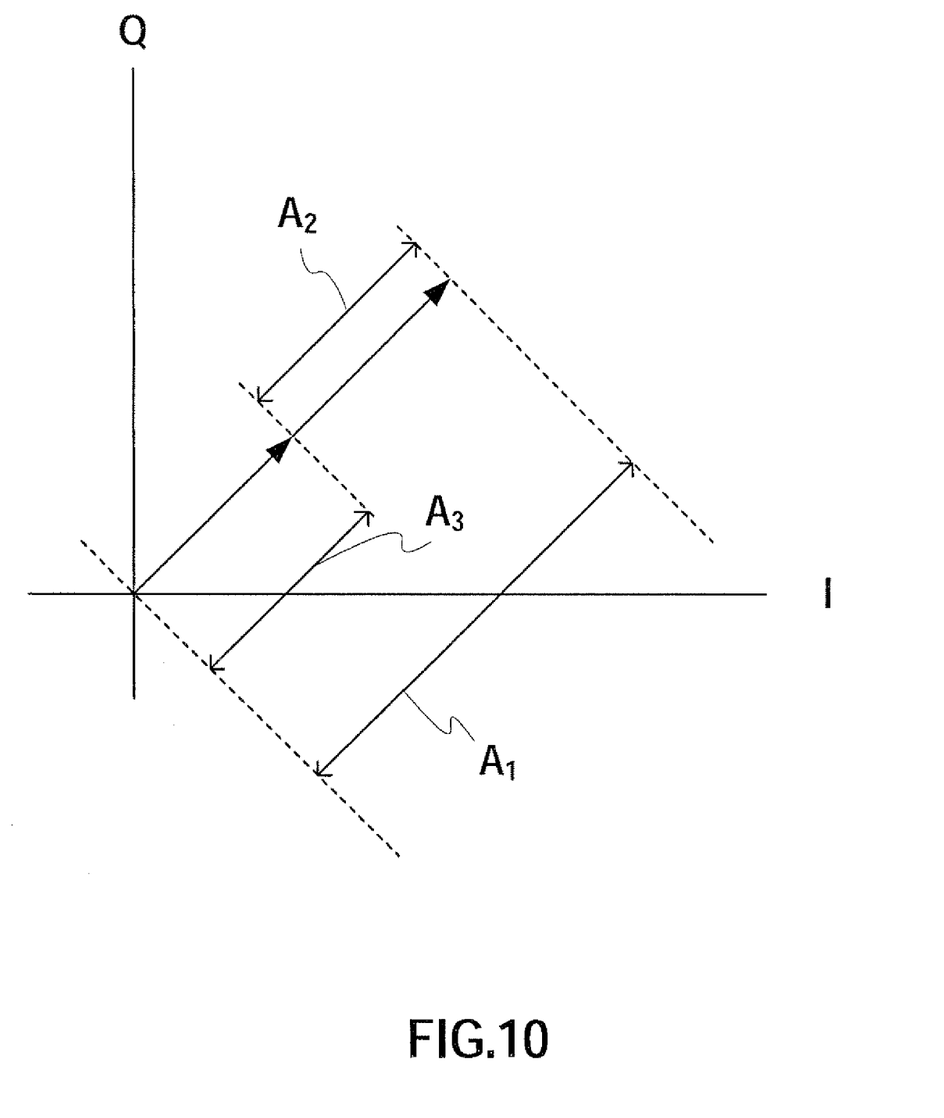
FIG. 10 explains the operations of power correction section, according to Embodiment 2 of the present invention.

Here, the correction of the received power value of pilot symbols will be described in detail. FIG. 10 illustrates the correction of received power on an IQ plane. In this figure, A1 represents the received power value of a pilot symbol before correction, A2 represents the amplification value calculated at power correction section 207, and A3 represents the received power value of the pilot symbol after correction. That is, power correction section 207 subtracts the amplification value A2 from a pilot symbol having the received power value A1, thereby obtaining a pilot symbol having the received power value A3.

Power attenuation section 208 attenuates the pilot symbols inputted from demultiplexing section 205 according to the amplification value reported from power correction section 207. In other words, power attenuation section 208 attenuates the power amplified at power amplifying section 110 of base station apparatus 100 from the pilot symbols. The attenuated pilot symbols are outputted to transmission channel estimation section 209.

Transmission channel estimation section 209 executes transmission channel estimation using the pilot symbols inputted from power attenuation section 208, and obtains a transmission channel estimation value. The obtained transmission channel estimation value is outputted to transmission channel compensation section 210.

In other words, a transmission channel estimation apparatus of this embodiment is configured by combining modulation parameter determining section 206, power correction section 207, power attenuation section 208 and transmission channel estimation section 209. The transmission channel estimation apparatus performs transmission channel estimation using the extracted pilot symbols based on the number of repetitions of the data symbol, and obtains a transmission channel estimation value. Also, with the transmission channel estimation apparatus, the received power value of the pilot symbols is correction as described above, and the transmission channel estimation value is compensated in the amplitude direction. Specifically, in the amplitude direction, the transmission channel estimation value is increased following the increase of the number of repetitions and is decreased following the decrease of the number of repetitions.

Transmission channel compensation section 210 performs transmission channel compensation on the data symbols inputted from demultiplexing section 205 based on the transmission channel estimation value inputted from transmission channel estimation section 209. The data symbols subjected to transmission channel compensation are outputted to demodulation section 211.

Demodulation section 211 combines the R data symbols inputted from transmission channel compensation section 210 and then demodulates the data symbols. In demodulation, the same modulation scheme is used as in modulation section 112 described in Embodiment 1. Decoding section 212 decodes the demodulated data symbols, thereby obtaining the received data.

In this way, according to this embodiment, when transmission channel estimation is performed according to the number of repetitions (that is, when the degree of received quality improvement for data symbols by means of combining increases following the increase of the number of repetitions), the transmission power value for pilot symbols is decreased on the transmitting side and the transmission channel estimation value is increased in the amplitude direction, and, on the other hand, when the degree of received quality improvement for data symbols by means of combining decreases following the decrease of the number of repetitions, the transmission power value for pilot symbols is increased on the transmitting side and the transmission channel estimation value is decreased in the amplitude direction, so that changes in the amplitude direction caused by transmission power control are corrected on the receiving side and the accuracy of transmission channel estimation values in the amplitude direction is maintained, consequently improving reception performance for data symbols subjected to M-ary modulation.

Although a case has been described with this embodiment where transmission channel estimation is performed after the received power value of pilot symbols is corrected according to the number of repetitions, compensation may be performed after transmission channel estimation. Further, correction may be performed after R data symbols are combined.

Although a case has been described with this embodiment, where a radio transmitting apparatus is provided in a base station apparatus, this radio transmitting apparatus may be provided in a communication terminal apparatus. In other words, the present invention can be applied to not only downlink communications but also uplink communications.

This concludes the description of embodiments of the present invention. However, the present invention can be implemented by modifying the above embodiments. For example, although with the above embodiments cases have been described where the present invention is configured by hardware, the present invention may be implemented by software.

The base station apparatuses in the above embodiments may be referred to as "Node B", and a communication terminal apparatus may be referred to as "UE".

Also, although with the above embodiments, the SNR is used as an of indicating measured reception quality, available indicators are not limited to this. It is possible to use, for example, the SIR, SINR (Signal to Interference and Noise Ratio), CIR (Carrier to Interference Ratio), CNR (Carrier to Noise Ratio), CINR (Carrier to Interference and Noise Ratio), RSSI (Received Signal Strength Indicator), received intensity, received power, interference power, error rate, transmission rate, throughput, amount of interference, and MCS (Modulation and Coding Scheme) that can achieve a predetermined error rate. Also, information indicating reception quality may be represented as, for example, CQI (Channel Quality Indicator) or CSI (Channel State Information).

In addition, each of functional blocks employed in the description of the above-described embodiment may typically be implemented as an LSI constituted by an integrated circuit. These are may be individual chips or partially or totally contained on a single chip.

"LSI" is adopted here but this may also be referred to as an "IC", "system LSI", "super LSI", or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

The present application is based on Japanese Patent Application No. 2004-380979, filed on Dec. 28, 2004, the entire content of which is expressly incorporated by reference herein.

INDUSTRIAL APPLICABILITY

The transmission power control apparatus, transmission channel estimation apparatus, transmission power control method and transmission channel estimation method of the present invention can be applied to base station and communication terminal apparatus in a radio communication system where pilot symbols used for transmission channel estimation are transmitted with data symbols.

The invention claimed is:

1. A transmission apparatus comprising:
a setting section that sets a first amplification value by subtracting a reception quality value reported from a receiving side from a target reception value of a pilot signal used for transmission channel estimation, sets an attenuation value which is set to be larger when a number of repetitions of a data signal increases, and sets a second amplification value by subtracting the attenuation value from the first amplification value;
an amplification section that amplifies power of the pilot signal according to the second amplification value; and
a transmission section that transmits the pilot signal with the amplified power.

2. A reception apparatus comprising:
a reception section that receives a pilot signal and a data signal;
a setting section that sets a first attenuation value by subtracting a reception quality value of the received pilot signal from a target reception value of the pilot signal, sets an amplification value which is set to be larger when a number of repetitions of the received data signal increases, and sets a second attenuation value by subtracting the amplification value from the first attenuation value;
an attenuation section that attenuates power of the received pilot signal according to the second attenuation value; and
a transmission channel estimation section that executes transmission channel estimation using the pilot signal with attenuated power.

3. A transmission power control method comprising:
setting a first amplification value by subtracting a reception quality value reported from a receiving side from a target reception value of a pilot signal used for transmission channel estimation;
setting an attenuation value which is set to be larger when a number of repetitions of a data signal increases;
setting a second amplification value by subtracting the attenuation value from the first amplification value; and
amplifying power of the pilot signal according to the second amplification value.

4. A transmission channel estimation method comprising:
receiving a pilot signal and a data signal;
setting a first attenuation value by subtracting a reception quality value of the received pilot signal from a target reception value of the pilot signal;
setting an amplification value which is set to be larger when a number of repetitions of the received data signal increases;
setting a second attenuation value by subtracting the amplification value from the first attenuation value;
attenuating power of the received pilot signal according to the second attenuation value; and
executing transmission channel estimation using the pilot signal with attenuated power.

* * * * *